United States Patent [19]

Graves

[11] Patent Number: 4,618,660

[45] Date of Patent: Oct. 21, 1986

[54] POLYMERIZATION CATALYST

[75] Inventor: Victoria Graves, Crosby, Tex.

[73] Assignee: Exxon Research & Engineering Co., Florham Park, N.J.

[21] Appl. No.: 771,393

[22] Filed: Aug. 30, 1985

Related U.S. Application Data

[62] Division of Ser. No. 626,172, Jun. 29, 1984, Pat. No. 4,554,265.

[51] Int. Cl.$^4$ ................................................ C08F 4/64
[52] U.S. Cl. ................................ 526/114; 526/348.5; 526/352; 502/113
[58] Field of Search .......................................... 526/114

[56] References Cited

U.S. PATENT DOCUMENTS

| | | | |
|---|---|---|---|
| 3,678,025 | 7/1972 | Birrell | 526/114 X |
| 4,109,071 | 8/1978 | Berger et al. | 526/114 |
| 4,210,559 | 7/1980 | Melquist et al. | 526/114 X |
| 4,471,066 | 9/1984 | Sakurai et al. | 526/114 X |

*Primary Examiner*—Patrick P. Garvin
*Attorney, Agent, or Firm*—M. B. Kurtzman

[57] ABSTRACT

An olefin polymerization catalyst produced by treating an inert support material, preferably a hydrated high surface area silica support having 1.00 to 1.50 hydroxyls per gram of silica with the reaction product of an organomagnesium compound and first a zirconium compound then a halogenator and tetravalent titanium compound, which when used as a cocatalyst with an organoaluminum compound produces polymers having broad molecular weight distribution.

20 Claims, No Drawings

POLYMERIZATION CATALYST

This is a division of application Ser. No. 626,172 filed 6/29/84 now U.S. Pat. No. 4,554,265.

BACKGROUND OF THE INVENTION

1. Field of the Invention

The present invention relates to a catalyst for use in the polymerization of alpha-olefins such as ethylene to obtain a wide molecular weight distribution in the resultant polymers and to the process of polymerizing alpha-olefins using the catalyst.

2. Related Art

It is well known that the alpha-olefins such as ethylene can be polymerized by contacting them under polymerization conditions with "Ziegler" type catalyst, i.e., a catalyst obtained by activating a Group 4b or 5b transition metal-containing catalyst component with a cocatalyst, e.g., a titanium compound activated with an organometallic compound. It is also well known that this type of catalyst produces polymer with a narrow molecular weight distribution. For many applications it is necessary and desirable to improve the toughness of the processed polymer. One method of improving toughness properties is by preparing polymers of high molecular weight (low melt index). However, at the higher molecular weights there is a corresponding and detrimental decrease in the rheological properties of the polymer. This is compensated for in practice by broadening the molecular weight distribution, which is typically obtained by using a chromium based catalyst system in place of the Ziegler type catalyst. However, in commercial operations where both types of polymer, i e., broad and narrow molecular weight distribution, are produced the presence of both Ti based Ziegler type catalysts and chromium based catalysts are required, and operational problems may occur since each catalyst is a poison to the other. Hence it is highly desirable that "Ziegler" compatible catalysts suitable for producing broad molecular weight polymer be developed.

According to the present invention it has been found that titanium based catalysts containing zirconium in addition to titanium and prepared by a particular procedure for use as a Ziegler type catalyst component, provide a broader molecular weight distribution for polymer produced therewith and are fully compatible with other Ziegler type catalysts.

U.S. Pat. No 4,325,835 to Hartshorn et al. discloses a component for an olefin polymerization catalyst which is the product of treating a particular support material with (a) an organomagnesium compound, (b) an aluminum compound e.g. ethyl aluminum dichloride, (c) an organometallic compound of general formula $R_mMX_p$ wherein M is a metal of Groups IA, IIA, IIB, IIIB, VA or VIA of a Periodic Table, R is a hydrocarbyl or substituted hydrocarbyl group, X is a singly charged anionic ligand or a monodentate neutral ligand, m is an integer up to the highest valency of the metal M and p is O or an integer up to 2 less than the valency of the metal M, e.g., zirconium tetrabenzyl, and (d) at least one transition metal compound of Groups IVA, VA or VIA, e.g., titanium tetrachloride.

U.S. Pat. No. 4,385,161 to Caunt et al. discloses a catalyst component for polymerization of olefin monomers which is a transition metal composition which is obtained by reacting together an inert particulate material, an organic magnesium compound, a halogen-containing compound such as carbon tetrachloride, silicon tetrachloride or boron trichloride and a specified transition metal compound such as $VOCl_3$, bis(n-butoxy) titanium dichloride or zirconium tetrabenzyl.

U.S. Pat. No. 4,396,533 to Johnstone discloses a supported Ziegler catalyst prepared by the following steps:

(A) heating together at a temperature in the range of 250° to 1100° C. a refractory oxide support material, such as silica, and one or more halogen-free metal derivatives which are hydrides and/or organic derivatives of the metal, such as titanium tetraisopropylate;

(B) reacting the product from (A) with one or more organometallic compounds having a general formula $MR^1_aQ_{b-a}$ wherein M is a metal atom, $R^1$ is a hydrocarbon group, Q is a halogen or an oxyhydrocarbyl group, b is a valency of M and a is an integer from 1 to b and wherein the metal atom M is aluminum, boron, lithium, zinc or magnesium such as triethyl aluminum; and (C) impregnating the solid product from step (B) with one or more halogen-containing transition metal compounds wherein the metal or metals comprise titanium and/or vanadium and/or zirconium such as a mixture of vanadium oxytrichloride and titanium tetrachloride.

U.S. Pat. No. 4,397,762 to Johnstone discloses a supported Ziegler catalyst prepared by the following steps, carried out under anhydrous conditions:

(A) reacting a hydroxyl groups-containing support material comprising magnesium silicate or silica and magnesia with one or more organometallic compounds having the general formula $MR^1_aQ_{b-a}$ wherein M is a metal which is aluminum, boron, lithium, zinc or magnesium, $R^1$ is a hydrocarbyl group, Q is a halogen or an oxyhydrocarbyl group, b is the valency of M and a is an integer from 1 to b;

(B) removing unreacted organometallic compound if any, from the produced solid material; and (C) impregnating the solid material obtained from step B with one or more halogen-containing transition metal compounds wherein the transition metal(s) comprise titanium, vanadium or zirconium.

European Patent Application No. 058,549 filed by Asaki Kasei Kogyo Kabushiki Karisha discloses a catalyst for polymerizing olefins comprising a solid catalyst component A and an organometallic component B in which the component A is obtained by reacting an (1) organometallic compound and (2) a transition metal compound or mixture of compounds of Ti, V, Ti and Va, and Ti and Zn in the presence of a (3) solid reaction product of (a) an organomagnesium compound and (b) a halide of B, Si, Ge, Sn, P, Sb, Bi, Zn or hydrogen chloride and optionally (c) a solid inorganic oxide.

Other references, e.g., U.S. Pat. Nos. 4,310,648, 4,356,111 and 4,399,053 issued to Shipley, et al. and U.S. Pat. No. 4,396,747 to Welch et al. disclose unsupported organomagnesium/Zr/Ti olefin polymerization catalyst, unlike the present composition which requires the use of dehydrated silica as a support.

It is an advantage of the present invention that a rather specific catalyst prepared from a limited class of components by a particular procedure has been discovered which produces broad molecular weight linear polymers of alpha-olefins. In particular, the present catalyst differs, among other reasons, from that of U.S. Pat. No. 4,325,835 in that that patent requires at least one aluminum compound; from U.S. Pat. Nos. 4,385,166, 4,396,533 and 4,397,762, in that a very wide and diverse variety of support materials and reactive components are taught by the references, which in the specifics produce substantially different catalysts from the present invention; from EPA No. 0058549 in that the reference discloses that a solid organomagnesium compound is present prior to the introduction of zirconium compound, and the use of an organometallic compound (1) of lithium, magnesium, aluminum or zinc as an additional catalyst component, whereas in the present catalyst preparation the zirconium compound reacts directly with the organomagnesium compound and the organometallic compound is not used.

The unsupported catalysts are less active than the present catalyst and polymers produced with such catalyst generally require deashing of the polymer to remove excess metals or operation at very high ethylene partial pressures.

SUMMARY OF THE INVENTION

Briefly in one aspect, the present invention is a supported olefin polymerization catalyst prepared under anhydrous conditions by the steps of:

(a) preparing a slurry of inert particulate support material. Preferable support material is a Group 2a, 3a, 4a or 4b metal oxide, and more preferably dehydrated high surface area silica having from 1.00 to 1.50 millimoles OH$^-$/gram of silica;

(b) adding to said slurry a solution of an organomagnesium compound;

(c) adding to said slurry and reacting a solution of zirconium compound;

(d) adding to said slurry and reacting a halogenator;

(e) adding to said slurry and reacting a tetravalent titanium compound; and (f) recovering solid catalyst.

The resulting catalyst is maintained under anhydrous conditions and is used with an organoaluminum cocatalyst to polymerize alpha olefins to produce low melt index polymers having a broad molecular weight distribution which is determined empirically from a ratio of melt index taken under two sets of conditions, i.e., HLMI/MI=MIR. Greater MIR's indicate a broad molecular weight distribution, although for different catalysts the MIR numbers do not indicate the same molecular weight distribution. Another measure of molecular weight distribution is the ratio of the weight average molecular weight (Mw) to the number average molecular weight (Mn) The ratio (Mw/Mn) is known as the polydispersity of the polymer and is readily obtained by size exclusion chromatography (i.e., gel permeation chromatography). The polymers produced in accordance with this invention will obtain Mw/Mn > 10, and preferably 15-22.

It has been found that the order of addition of the first three components is essential to the ability of the catalyst to produce broad molecular weight distribution polymers. Although the order of the last two steps is not as significant, that set forth is preferred. Omission of the zirconium component produces active catalyst, but the polymers have very narrow molecular weight distribution.

DETAILED DESCRIPTION OF THE INVENTION

Typically, the support can be any of the solid particulate porous supports such as silica, talc, zirconia, thoria, magnesia and titania. Preferably the support material is a Group 2a, 3a, 4a and 4b metal oxide in finely divided form.

Suitable inorganic oxide materials which are desirably employed in accordance with this invention include silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed. For example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subject to a thermal treatment in order to remove water and reduce the concentration of the surface hydroxyl groups. The treatment is carried out in vacuous or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed.

Suitable dehydrated silica preferably has a surface area of at least 20 m$^2$/g, preferably at least about 100 m$^2$/g and particle diameter of about 0.01 to 500 microns, preferably about 0.1 to 100 microns. The silica may be obtained by dehydrating silica gel by fluidizing in a stream of dry nitrogen for a period of about twenty hours at temperature sufficient to remove both adsorbed and chemically bound water, provided the resultant silica contains not less than 1.00 millimoles of OH$^-$/g of silica and preferably from 1.20 to 1.50 millimoles of OH$^-$/g of silica. It has been found that the benefit of broad molecular weight distribution is best obtained in this range. Generally the dehydrating temperature would be from 200° C. to 900° C., preferably about 300° C. to 500° C., most preferably 450° C.

The organomagnesium compound include hydrocarbon soluble dihydrocarbylmagnesium wherein the hydrocarbyls have from 1 to 30 carbon atoms, such as dialkyl, diaryl, dialkaryl, diaralkyl, said alkyl including cyclic and acyclic radicals, preferably the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein each alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides, and aryl and alkyl magnesium halides with the halogen-free organomagnesium compounds being more desirable.

The zirconium compound includes halides, alkoxyhalides, alkoxides and chelate compounds. Suitable zirconium compounds which can be employed herein include those represented by the empirical formula: $Zr(OR)_xX_y$, wherein each R is independently a hydrocarbyl group having from 1 to about 20, preferably 1 to about 10, carbon atoms, each X is independently a halogen atom, preferably chlorine or bromine, and x and y independently have values from zero to 4 with the value of x plus y being 4, such as zirconium tetrachloride, zirconium tetrabromide, ethoxytrichlorozirconium, diethoxydichlorozirconium, dibutoxydichlorozirconium, ethoxytrichlorozirconium, butoxytrichlorozirconium, tetraethoxyzirconium, tetrabutoxyzirconium, zirconium acetylacetonate, di(2-ethyl hexoxy) dichlorozirconium and any mixture thereof.

The halogenators include the chlorides, bromides and fluorides of Group 3a, 4a and 5a metals of the Periodic Table of elements (U.S. standard Periodic Table as shown on the back cover of Handbook of Chemistry and Physics, 45th Edition, The Chemical Rubber Co., 1964) more preferably B, Si, Ge, Sn, P, Sb and Bi and hydrogen halides such as HCl, HBr and HF.

The halides are the compounds having at least one halogen atom. Preferred halides are the chlorides. Exemplary halides include boron halides such as boron trichloride, diethylboron chloride, dibutylboron chloride, diphenylboron chloride, ethylboron dichloride, butylboron dichloride, phenylboron dichloride, ethoxyboron dichloride and boron tribromide; silicon halides such as methylchlorosilane, methyldichlorosilane, tetrachlorosilane, trichlorosilane, methyltrichlorosilane, dimethylchlorosilane, dimethyldichlorosilane, trimethylchlorosilane, ethyldichlorosilane, ethyltrichlorosilane, diethylchlorosilane, diethyldichlorosilane, triethylchlorosilane, vinyltrichlorosilane, vinyldichlorosilane, propyltrichlorosilane, propyldichlorosilane, allyltrichlorosilane, butyltrichlorosilane, butyldichlorosilane, isobutyltrichlorosilane, sec-butyltrichlorosilane, tert-butyltrichlorosilane, sym-tetramethyldichlorosilane, octyldichlorosilane, decyltrichlorosilane, decyldichlorosilane, pentachlorodisilmethylene, hexachlorodisilmethylene, hexachlorocyclotrisilmethylene, phenyltrichlorosilane, phenyldichlorosilane, benzyltrichlorosilane, ethoxytrichlorosilane, diethoxydichlorosilane, butoxydichlorosilane, octoxytrichlorosilane and tetrabromosilane; germanium halides such as tetrachlorogermanium, methyltrichlorogermanium, dimethyldichlorogermanium, trimethylchlorogermanium, ethyltrichlorogermanium, butyltrichlorogermanium and ethoxytrichlorogermanium; tin halides such as tin tetrachloride, methyltrichlorotin, diethyldichlorotin, dibutoxydibutyltin, trioctylchlorotin and tin tetrabromide; phosphorus halides such as phosphorus trichloride, phosphorus tribromide, phosphorus pentachloride, ethyldichlorophosphine and propyldichlorophosphine; antimony halides such as methyldichlorostibine, trimethylantimony dichloride and tripropylantimony dichloride and bismuth halides such as methyldichlorobismuthine; ethyldichlorobismuthine, butyldichlorobismuthine and dimethylchlorobismuthine. Of these compounds, chlorides of boron, tin, silicon or germanium are preferred in order to obtain polymers having a good particle size distribution and a high bulk density, and chlorides of boron are more preferred.

The tetravalent titanium compounds employed in this invention include halides, alkoxyhalides, alkoxides, siloxyhalides, siloxides, aromatic ring complexes and chelate compounds of titanium such as titanium tetrachloride, titanium tetrabromide, titanium tetraiodide, ethoxytitanium trichloride, propoxytitanium trichloride, butoxytitanium trichloride, octoxytitanium trichloride, diethoxytitanium dichloride, dipropoxytitanium dichloride, dibutoxytitanium dichloride, triethoxytitanium monochloride, tripropoxytitanium monochloride, tributoxytitanium monochloride, phenoxytitanium trichloride, benzoyltitanium trichloride, dicyclopentadienyltitanium dichloride, tetraisopropoxytitanium, tetrapropoxytitanium, tetrabutoxytitanium, bis(triphenylsiloxy)titanium dichloride, titanium acetylacetonate and any mixtures thereof.

Generally the silica or other support comprises from 44 to 84 weight percent of the total catalyst composition, preferably about 48 to 54 weight percent.

The proportions of the foregoing components of the catalyst are such that the atomic ratios of the elements are:

Mg:Zr is from about 1:1 to about 14:1; preferably from about 4:1 to 12:1; more preferably 6:1 to 9:1.

Zr:Ti is from about 0.1:1 to about 10:1; preferably from about 0.3:1 to 5:1; more preferably 0.4:1 to 3:1.

The reaction to produce the present catalyst is carried out in the presence of an inert diluent. The concentrations of catalyst components are preferably such that when the essential components are combined, the resultant slurry is from about 0.0005 to about 1.0 molar (moles/liter) with respect to magnesium. By way of an example of suitable inert organic diluents can be mentioned liquefied ethane, propane, isobutane n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to 200° C. Also included as suitable inert diluents are benzene, toluene, ethylbenzene, cumene, decalin and the like.

Mixing of the catalyst components to provide the present catalyst is carried out under an inert atmosphere such as nitrogen, argon or other inert gas at temperatures in the range from about 100° to about 200° C., preferably from about 0° to about 100° C. The period of mixing is not considered to be critical as it is found that a sufficient catalyst composition most often occurs within about 1 minute or less. In the preparation of the present catalyst, the catalysts should be washed to remove hydrocarbon soluble components from hydrocarbon insoluble components of the reaction product.

In a second aspect, the invention is a process for polymerizing at least one alpha-olefin under conditions characteristic of Ziegler polymerization wherein the catalyst of the present invention is employed as a cocatalyst with an organometallic compound containing aluminum. Preferred organoaluminum compounds have the empirical formula $AlR_{3-a}X_a$ wherein each R is independently hydrocarbyl as hereinbefore defined such as alkyl, X is a halogen and a is a number from 0 to 3. Suitable organoaluminum compound include trialkylaluminums such as $Al(C_2H_5)_3$, $Al(C_3H_7)_3$, $Al(C_4H_9)_3$, $Al(C_5H_{11})_3$, $Al(C_6H_{13})_3$, $Al(C_8H_{17})_3$ and $Al(C_{10}H_{21})_3$, alkylaluminum hydrides such as $Al(C_2H_5)_2H$ and $Al(i-C_4H_9)_2H$, alkylaluminum halides such as $Al(C_2H_5)_2Cl$, $Al(C_2H_5)Cl_2$, $Al(i-C_4H_9)_2Cl$ and $Al(C_2H_5)_2Br$, alkylaluminum alkoxides such as $Al(C_2H_5)_2(OC_2H_5)$ and $Al(i-C_4H_9)_2(OC_4H_9)$. The atomic ratio of Al:Ti may be in the range of 0.1:1 to 200:1, generally less than 50:1.

In the polymerization process employing the present catalyst, polymerization is effected by adding a catalytic amount of the above catalyst composition and organoaluminum cocatalyst (catalyst system) to a polymerization zone containing alpha-olefin monomer, or vice versa. The polymerization zone is maintained at temperatures in the range from about 0° to about 300° C., preferably at slurry polymerization temperatures, e.g., from about 75° to about 110° C. (about 130° C. to 250° C. for solution polymerization), for a residence time of about a few seconds to several days, preferably 15 seconds to 2 hours. It is generally desirable to carry out the polymerization in the absence of moisture and oxygen with a catalytic amount of the present catalyst being within the range from about 0.0001 to about 0.1 millimoles titanium per liter of diluent. It is understood, however, that the most advantageous catalyst concentration will depend upon polymerization conditions such as temperature, pressure, diluent and presence of catalyst poisons, and that the foregoing range is given to obtain maximum catalyst yields in weight of polymer per unit weight of titanium. Generally the diluent is selected from paraffins and cycloparaffins having 3 to 30 carbon atoms. Suitable diluents include for example isobutane, isopentane, hexane, cyclohexane and the like.

The polymerization pressures preferably employed are relatively low, e.g., from about 50 to about 1000 psig, especially from about 100 to about 700 psig. However, polymerization within the scope of the present invention can occur at pressures from atmospheric up to pressures determined by the capabilities of the polymerization equipment. During polymerization it is desirable to stir the polymerization system to obtain better temperature control and to maintain uniform polymerization mixtures throughout the polymerization zone.

In order to optimize catalyst yields in the slurry polymerization of ethylene, it is preferable to maintain the total system pressure in the range of 100 to 200 psig. To achieve this ethylene is fed on demand.

Hydrogen can be employed in the practice of this invention to lower the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The catalyst of this invention is especially useful in gas phase polymerization in which fluidization process is employed.

The monomer or mixture of monomers is contacted with the catalyst system in any conventional manner, preferably by bringing the present catalyst system and monomer together with intimate agitation provided by suitable stirring or other means. Agitation can be continued during polymerization, or in some instances, the polymerization mixture can be allowed to remain unstirred while the polymerization takes place. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The catalysts of this invention are useful for the polymerization of olefins and particularly useful for the polymerization of ethylene and higher alpha olefins (e.g., $C_3$-$C_8$). The advantages of this invention are especially obtained in the polymerization of ethylene to high density polyethylene (density about 0.940-0.960) and the polymerization of ethylene with higher olefins ($C_3$-$C_8$) and/or diolefins to obtain linear low density polyethylenes (density about 0.918-0.958). The preferred comonomers of ethylene are propylene, butene-1, pentene-1, 4-methyl pentene-1, hexene-1 and octene-1.

The polymer is readily recovered from the polymerization mixture by driving off unreacted monomer and/or diluent. No further removal of impurities is required. The resultant polymer is found to contain insignificant amounts of catalyst residue and to possess a relatively broad molecular weight distribution.

The invention will be more clearly understood by reference to the following examples. These examples illustrate specific embodiments of the present invention and should not be construed to limit the invention in any way.

EXAMPLES

Typical Silica Dehydration

The silica is dehydrated by fluidizing the solid particles in a stream of dry nitrogen gas in a tube placed in a vertical tube furnace. Adjust temperature to 150° C. inside the fluidized bed and hold for three hours to remove bulk $H_2O$. Raise the temperature to the desired level and hold for a minimum of twelve hours, preferably twenty hours. The furnace is then turned off and the silica allowed to cool while maintaining a flow of nitrogen. The number of residual hydroxyls can be determined by heating a weighed sample of the silica gel at 1000° C. for twenty two hours. The weight loss on ignition can be used to determine the weight (mmoles) of OH per gram of dehydrated silica.

EXAMPLE 1

CATALYST PREPARATION

Davison Chemical Co 952 silica gel, 2 g (dehydrated at 400°-500° C.), was slurried in heptane. Three mmoles of butylethylmagnesium (BEM) in heptane was added to the slurry and agitated for 1 hour. Then 0.15 mmoles di(2-ethyl hexoxy) dichlorozirconium in a nonane solution was added to the slurry and agitation continued for one hour. A chlorinator (0.6 mmoles of $BCl_3$ in methylene chloride) was then added to the slurry followed by the addition of 1 mmole of $TiCl_4$ in heptane. The slurry was stirred for an additional hour, then filtered and washed twice to give the final catalyst.

EXAMPLE 2

POLYMERIZATION

Using the catalyst described in Example 1, three runs were made in a 1.6 liter stainless steel autoclave. 760 ml of hexane, 90 mmoles hydrogen, a specified cocatalyst as shown in Table I and 200 mg of the catalyst of Example 1 were added to the autoclave. The slurry was agitated using a stirrer speed of 1200 rpm and the temperature raised to 85° C. Ethylene was admitted to the reactor until a gauge pressure of 150 pounds was achieved. This pressure was maintained throughout the reaction by feeding ethylene continuously. The reaction was continued for forty minutes at which time the ethylene flow was terminated and the reactor vented to atmospheric pressure. The results of the reaction and polymer properties are reported in Table I. The Melt Index (MI) is ASTM D 1238, 2.16 grams, condition B. The High Load Melt Index (HLMI) is ASTM D 1238, 21.6 grams, condition F. The ratio of HLMI/MI (MIR)

indicates the molecular weight distribution of the polymer, higher ratio indicate broad distribution.

EXAMPLE 3

CATALYST PREPARATION

All operations of catalyst preparation were conducted in a nitrogen purged dry box or in equipment from which air and moisture could be excluded. To a 125 ml Wheaton vial containing a magnetic stirring bar were added three grams of dehydrated Crosfield SD 293 silica gel (about 400° C. in nitrogen atmosphere). To the vial was added 40 ml of spectroquality heptane to give a slurry concentration of 0.075 g silica/ml. To the slurry was added over two minutes 7.9 ml of a 0.68M solution of ethyl-n-butyl magnesium (Stauffer Chemical Co.) in heptane. The slurry was stirred at ambient temperature for thirty minutes. To the slurry was added 2.1 ml of a 0.28M solution of di(2-ethyl hexoxy) dichlorozirconium in nonane. The slurry was then rapidly heated to 85° C. and held at this temperature for 15 minutes. The agitated slurry was allowed to cool to ambient and 0.9 ml of 1.0M solution of $BCl_3$ in methylene chloride was added to the vial. The slurry was stirred for one hour and 1.5 ml of a 1.0M solution of $TiCl_4$ in heptane added to the slurry. The slurry was heated to 85° C. and held at this temperature for 15 minutes. The slurry was then allowed to cool to ambient temperature and the solid separated by filtration on a glass frit. The solid was washed twice with 40 ml of fresh heptane and dried by rotary flash evaporation. The weight of the recovered solid catalyst was 4.321 g and metals analysis showed the following composition: 2.45 wt % Mg 0.97 wt % Zr 0.21 wt % B and 1.7 wt % Ti (this composition is designated as Run 1.

Following the same general procedure described above eight additional catalysts were prepared. The variations in each preparation from the general procedure is noted in Table II.

EXAMPLE 4

POLYMERIZATION

Using each of the above nine catalysts an ethylene/hexene copolymerization was carried out as follows:

Polymerization:

To a 1.6 liter stainless steel autoclave were charged 760 ml hexane, 150 ml hexene, 200 mmoles hydrogen, 2.12 mmoles triisobutylaluminum, 2 mmoles 1,2 dichloroethane as promoter and 100 mgrams of the catalyst composition. The slurry was agitated using a stirrer speed of 1200 rpm and the temperature was raised to 85° C. Ethylene was then admitted to the reactor until a total gauge pressure of 150 pounds was achieved. This pressure was maintained throughout the reaction by feeding ethylene continuously. The reaction was continued for forty minutes at which time the ethylene flow was stopped and the reactor vented to atmospheric pressure. TABLE III shows the results of the polymerizations and some tests of physical property. The Run numbers correspond to the catalyst Run numbers of Table II.

In these runs a promoter was used at low levels, which has no noticeable effect on molecular distribution but does increase the catalyst activity substantially.

TABLE I

| Run # | mg Cat | Cocat[1] | ml Cocat | mmoles $H_2$ | Yield g | MI dg/min | HLMI dg/min | MIR |
|---|---|---|---|---|---|---|---|---|
| 1 | 200 | TIBAL | 3.30 | 90 | 84.88 | 0.20 | 5.80 | 29 |
| 2 | 200 | TNOAL | 6.25 | 90 | 186.25 | 0.11 | 4.40 | 40 |
| 3 | 200 | IPAL | 7.48 | 90 | 394.46 | 0.08 | 3.30 | 41.25 |
| 4 | 200 | IPAL | 3.74 | 90 | 281.26 | 0.10 | 4.00 | 40 |

[1]TIBAL = trisobutylaluminum
TNOAL = tri-n-octylaluminum
IPAL = trisoprenylaluminum

TABLE II

| RUN NO. | g Silica ml soln | mmoles BEM | mmoles Zr | Treatment time, min | Treatment temp., °C. | mmoles $BCl_3$ | Treatment time, min | Treatment temp., °C. |
|---|---|---|---|---|---|---|---|---|
| 1 | 0.075 | 5.4 | 0.6 | 15 | 85° C. | 0.9 | 60 | ambient |
| 2 | 0.04 | 2.4 | 1.5 | 60 | ambient | 2.4 | 15 | ambient |
| 3 | 0.075 | 2.4 | 1.5 | 15 | ambient | 2.4 | 60 | ambient |
| 4 | 0.075 | 2.4 | 1.5 | 60 | 85° C. | 0.9 | 60 | ambient |
| 5 | 0.075 | 5.4 | 1.5 | 15 | 85° C. | 2.4 | 15 | ambient |
| 6 | 0.04 | 5.4 | 1.5 | 60 | ambient | 0.9 | 60 | ambient |
| 7 | 0.075 | 5.4 | 0.6 | 60 | ambient | 2.4 | 60 | ambient |
| 8 | 0.075 | 2.4 | 0.6 | 15 | 85° C. | 0.9 | 15 | ambient |
| 9 | 0.040 | 2.4 | 0.6 | 15 | ambient | 0.9 | 60 | ambient |

| RUN NO. | mmoles $TiCl_4$ | Treatment time, min | Treatment temp. °C. | Catalyst Analysis | | | |
|---|---|---|---|---|---|---|---|
| | | | | % Mg | % Zr | % B | % Ti |
| 1 | 1.5 | 15 | 85 | 2.45 | 0.97 | 0.21 | 1.7 |
| 2 | 0.9 | 60 | 85 | 1.71 | 2.88 | 0.20 | 1.74 |
| 3 | 1.5 | 60 | ambient | 1.04 | 2.86 | 0.11 | 0.64 |
| 4 | 0.9 | 60 | ambient | 0.96 | 2.66 | 0.21 | 1.21 |
| 5 | 1.5 | 15 | ambient | 2.4 | 2.29 | 0.39 | 0.59 |
| 6 | 0.9 | 15 | ambient | 1.16 | 0.76 | 0.25 | 1.7 |
| 7 | 1.5 | 15 | 85 | 2.29 | 0.64 | 0.22 | 1.09 |
| 8 | 0.9 | 60 | 85 | 1.5 | 0.63 | 0.22 | 1.03 |
| 9 | 1.5 | 15 | 85 | 1.89 | 2.57 | 0.16 | 0.83 |

TABLE III

| Run # | Yield, g | Productivity g/g.hr. | MI dg/min | HLMI dg/min | MIR | Density g/cc |
|---|---|---|---|---|---|---|
| 1 | 154.9 | 1161 | 0.023 | 1.4 | 60.9 | 0.9388 |
| 2 | 108.18 | 1620 | 0.03 | 3.1 | 103 | 0.9401 |

TABLE III-continued

| Run # | Yield, g | Productivity g/g.hr. | MI dg/min | HLMI dg/min | MIR | Density g/cc |
|---|---|---|---|---|---|---|
| 3 | 155.48 | 2325 | 0.02 | 2.8 | 142 | 0.9438 |
| 4 | 84.47 | 1260 | 0.02 | 1.7 | 85 | 0.9350 |
| 5 | 54.31 | 810 | 0.04 | 2.10 | 53 | 0.9361 |
| 6 | 230.2 | 3453 | 0.09 | 5.3 | 59 | 0.9375 |
| 7 | 117.3 | 1757 | 1.28 | 53.4 | 42 | 0.9353 |
| 8 | 80.8 | 1201 | 0.04 | 2.9 | 73 | 0.9398 |
| 9 | 49.2 | 738 | 0.11 | 5.67 | 52 | 0.9392 |

The invention claimed is:

1. A process for polymerizing at least one alpha-olefin under conditions characteristic of Ziegler polymerization wherein the polymerization is conducted in the presence of a catalyst comprising:
I. A supported catalyst prepared under anhydrous conditions by the steps of:
  (1) sequentially
    (a) preparing a slurry of inert particulate support material;
    (b) adding to said slurry a solution of an organomagnesium compound;
    (c) adding to said slurry and reacting a solution of zirconium compound; and
  (2) thereafter
    (d) adding to said slurry and reacting a halogenator;
    (e) adding to said slurry and reacting a tetravalent titanium compound;
    (f) recovering solid catalyst; and
II. an organoaluminum compound.

2. The process in accordance with claim 1 wherein said inert particulate support material is dehydrated high surface area silicate.

3. The process in accordance with claim 2 wherein said silica has from about 1.00 to 1.50 millimoles OH/-gram of silica.

4. The process in accordance with claim 1 wherein said organomagnesium compound is a dihydrocarbylmagnesium compound.

5. The catalyst according to claim 4 wherein said dihydrocarbyl is dialkyl.

6. The catalyst according to claim 4 wherein said dihydrocarbyl is diaryl.

7. The catalyst according to claim 4 wherein said organomagnesium compound is one of n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium or mixtures thereof.

8. The process according to claim 4 wherein said organomagnesium compound is one of diphenylmagnesium, dibenzylmagnesium, ditolylmagnesium or mixtures thereof.

9. The process according to claim 4 wherein said organomagnesium compound is ethyl-n-butyl magnesium.

10. The process according to claim 1 wherein said zirconium compound is a halide, alkoxyhalide, alkoxide, chelate or mixture thereof.

11. The catalyst according to claim 10 wherein said zirconium compound is represented by the empirical formula $Zr(OR)_xX_y$, wherein R is independently a hydrocarbyl group having from 1 to about 20 carbon atoms, each X is independently chlorine or bromine, and x and y independently have values from zero to 4 with the value of x plus y being 4.

12. The process according to claim 9 wherein said zirconium compound is di(2-ethylehexoxy)dichlorozirconium.

13. The process according to claim 1 wherein said halogenator is a chloride, bromide or fluoride of a metal from Group 3a, 4a, or 5a of the Periodic Table of Elements or mixtures thereof.

14. The process according to claim 13 wherein said metal is B, Si, Ge, Sn, P, Sb or Bi or mixtures thereof.

15. The process according to claim 14 wherein said halogenator is a chloride.

16. The process according to claim 15 whereun said metal is B.

17. The process according to claim 12 wherein said halogenator is $BCl_3$.

18. The process according to claim 1 wherein said tetravalent titanium compound is a halide, alkoxyhalide, alkoxide, siloxyhalide, siloxide, aromatic ring complex, chelate or mixture thereof.

19. The process according to claim 18 wherein said tetravalent titanium compound is $TiCl_4$.

20. The process according to claim 1 wherein the atomic ratio of Mg:Zr is from about 1:1 to about 14:1, and of Zr to Ti is from about 0.1:1 to about 10:1.

* * * * *